United States Patent
Disch et al.

(10) Patent No.: US 12,390,078 B2
(45) Date of Patent: *Aug. 19, 2025

(54) COUNTER SYSTEM FOR TRANSFERRING IN PARTICULAR AT LEAST PARTIALLY UNPACKAGED FOODSTUFFS, AND METHOD FOR RECEIVING CUSTOMER-SPECIFIC AND IN PARTICULAR PERSONALIZED ORDERS IN A COUNTER SYSTEM

(71) Applicant: ILLINOIS TOOL WORKS INC., Glenview, IL (US)

(72) Inventors: Harald Disch, Elzach (DE); Martin Schrempp, Biberach (DE); Adrian Boldt, Offenburg (DE); Jeffrey R. Newcomer, Troy, OH (US); Joel Hipp, Tipp City, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,735

(22) Filed: Dec. 12, 2023

(65) Prior Publication Data
US 2024/0099545 A1 Mar. 28, 2024

Related U.S. Application Data

(63) Continuation of application No. 17/213,772, filed on Mar. 26, 2021, now Pat. No. 11,889,964.

(30) Foreign Application Priority Data

Mar. 31, 2020 (DE) ...................... 10 2020 108 881.7

(51) Int. Cl.
*A47L 15/00* (2006.01)
*A47L 15/42* (2006.01)
(Continued)

(52) U.S. Cl.
CPC ....... *A47L 15/0071* (2013.01); *A47L 15/0073* (2013.01); *A47L 15/0089* (2013.01);
(Continued)

(58) Field of Classification Search
None
See application file for complete search history.

(56) References Cited

U.S. PATENT DOCUMENTS

| | | | |
|---|---|---|---|
| 1,502,131 | A | 7/1924 | Vaudreuil |
| 1,617,021 | A | 2/1927 | Mitchell |

(Continued)

FOREIGN PATENT DOCUMENTS

| | | | |
|---|---|---|---|
| CA | 890572 | A | 1/1972 |
| CN | 101641037 | A | 2/2010 |

(Continued)

OTHER PUBLICATIONS

DE_202016101201 translation (Year: 2016).*

*Primary Examiner* — Rita P Adhlakha
(74) *Attorney, Agent, or Firm* — THOMPSON HINE LLP

(57) ABSTRACT

A counter system for transferring foodstuffs, wherein the counter system has a first region assigned to the counter staff and a second region segregated therefrom and assigned to the customer. The counter system also has a dishwasher for cleaning items of washware, in particular in the form of mugs, cups, glasses, bowls or plates. The dishwasher has a treatment zone, an introduction region and a removal region, wherein the introduction region is accessible from the second region of the counter system and the removal region is accessible from the first region of the counter system.

7 Claims, 10 Drawing Sheets

(51) Int. Cl.
  *A47L 15/46* (2006.01)
  *A47L 15/48* (2006.01)
  *B65G 29/00* (2006.01)
(52) U.S. Cl.
  CPC ....... *A47L 15/0097* (2013.01); *A47L 15/4214* (2013.01); *A47L 15/4257* (2013.01); *A47L 15/4285* (2013.01); *A47L 15/46* (2013.01); *A47L 15/48* (2013.01); *B65G 29/00* (2013.01); *A47L 2501/24* (2013.01)

(56) References Cited

U.S. PATENT DOCUMENTS

| | | | |
|---|---|---|---|
| 1,693,780 | A | 12/1928 | Griffiths |
| 1,814,508 | A | 7/1931 | Griffiths |
| 3,092,120 | A | 6/1963 | Hilger et al. |
| 3,486,939 | A | 12/1969 | Pinckard |
| 3,886,959 | A | 6/1975 | Stott |
| 3,940,944 | A | 3/1976 | Lapeyre |
| 3,942,545 | A | 3/1976 | Flynn |
| 4,825,887 | A | 5/1989 | Nezworski |
| 4,832,064 | A | 5/1989 | Nezworski |
| 5,522,410 | A | 6/1996 | Meilleur |
| 6,276,373 | B1 | 8/2001 | Gotfried |
| 6,394,285 | B1 | 5/2002 | Arthurs et al. |
| 10,945,582 | B1 | 3/2021 | Morman et al. |
| 2002/0020435 | A1 | 2/2002 | Varpio |
| 2005/0072449 | A1 | 4/2005 | Alpert et al. |
| 2006/0060215 | A1 | 3/2006 | Lee |
| 2007/0125729 | A1 | 6/2007 | Krueger |
| 2008/0149149 | A1 | 6/2008 | Ryu et al. |
| 2011/0290804 | A1 | 12/2011 | Kohles et al. |
| 2012/0111372 | A1 | 5/2012 | Hesterberg et al. |
| 2012/0298146 | A1 | 11/2012 | Padtberg et al. |
| 2013/0099715 | A1 | 4/2013 | Fuhge |
| 2013/0340790 | A1 | 12/2013 | Lemley |
| 2014/0285075 | A1 | 9/2014 | Lundberg et al. |
| 2015/0107630 | A1 | 4/2015 | Varnals et al. |
| 2016/0007824 | A1 | 1/2016 | Maier et al. |
| 2016/0177493 | A1 | 6/2016 | Pittalis et al. |
| 2016/0324397 | A1 | 11/2016 | Jung et al. |
| 2016/0338566 | A1 | 11/2016 | Shabtai |
| 2018/0338666 | A1 | 11/2018 | Seewang et al. |
| 2019/0301073 | A1 | 10/2019 | Kessler et al. |
| 2021/0259509 | A1 | 8/2021 | Sperry |
| 2021/0369076 | A1 | 12/2021 | McGinness et al. |
| 2022/0079413 | A1 | 3/2022 | Longo et al. |

FOREIGN PATENT DOCUMENTS

| | | | | |
|---|---|---|---|---|
| CN | 103889298 | A | 6/2014 | |
| CN | 105338865 | A | 2/2016 | |
| CN | 106073683 | A | 11/2016 | |
| CN | 106455896 | A | 2/2017 | |
| CN | 107374538 | A | 11/2017 | |
| CN | 208510962 | U | 2/2019 | |
| CN | 109394119 | A1 | 3/2019 | |
| CN | 107233058 | B | 6/2019 | |
| CN | 109984703 | A | 7/2019 | |
| CN | 111166264 | A | 5/2020 | |
| CN | 112190207 | A | 1/2021 | |
| CN | 112315397 | A | 2/2021 | |
| DE | 2727067 | A1 | 1/1979 | |
| DE | 4136923 | A1 | 5/1993 | |
| DE | 4241064 | A1 | 6/1994 | |
| DE | 19644438 | A1 | 4/1998 | |
| DE | 20017158 | U1 | 12/2000 | |
| DE | 20317895 | U1 | 2/2004 | |
| DE | 102013226080 | A1 | 6/2015 | |
| DE | 102018103585 | A1 | 9/2018 | |
| DE | 102017129799 | A1 | 6/2019 | |
| DE | 102016117116 | B4 * | 7/2019 | ............ A47J 31/007 |
| DE | 102019119462 | A1 | 1/2021 | |
| EP | 0048519 | B1 | 12/1984 | |
| EP | 0600125 | A1 | 6/1994 | |
| EP | 0593876 | B1 | 4/1997 | |
| EP | 1532916 | A2 | 5/2005 | |
| EP | 3015043 | A1 | 5/2016 | |
| EP | 3357398 | A1 | 8/2018 | |
| GB | 565183 | A | 10/1944 | |
| JP | 2002209691 | A | 7/2002 | |
| KR | 20040087763 | A | 10/2004 | |
| KR | 20060065289 | A | 6/2006 | |
| KR | 20060068402 | A | 6/2006 | |
| KR | 101757580 | B1 | 7/2017 | |
| KR | 20180068569 | A | 6/2018 | |
| WO | WO 2005044473 | A1 | 5/2005 | |
| WO | WO 2009011524 | A1 | 1/2009 | |
| WO | WO 2018087519 | A1 | 5/2018 | |
| WO | WO 2020186344 | A1 | 9/2020 | |
| WO | WO 2021011604 | A1 | 1/2021 | |
| WO | WO 2021116749 | A1 | 6/2021 | |

* cited by examiner

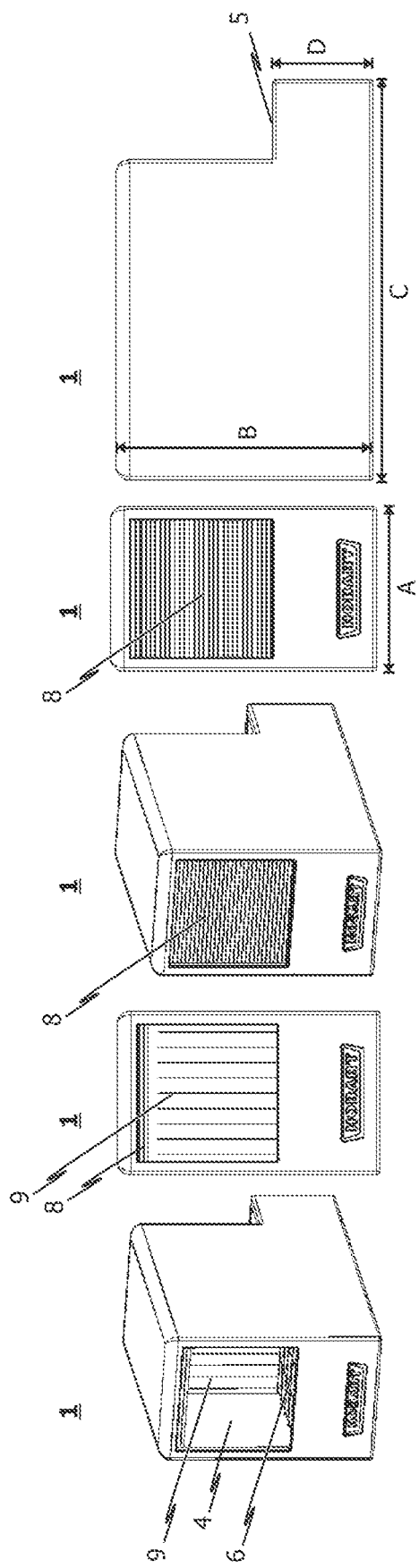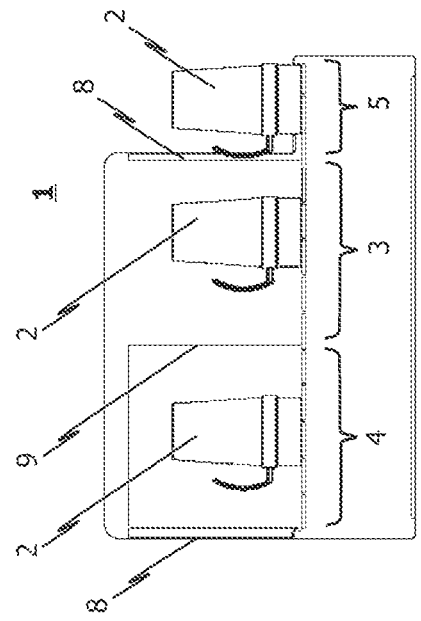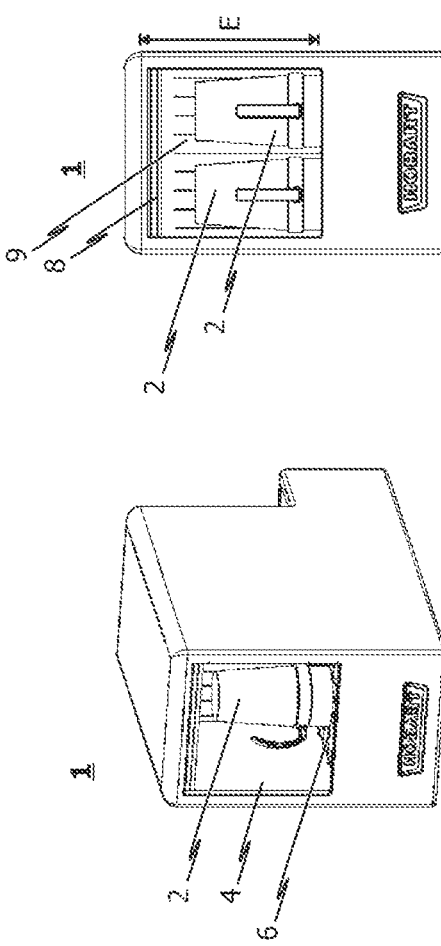

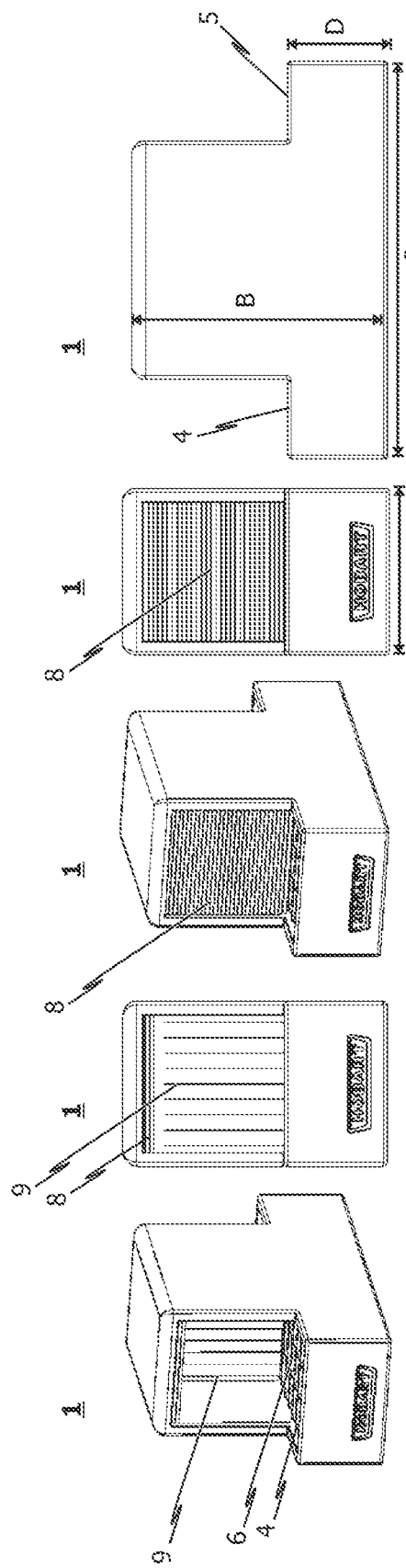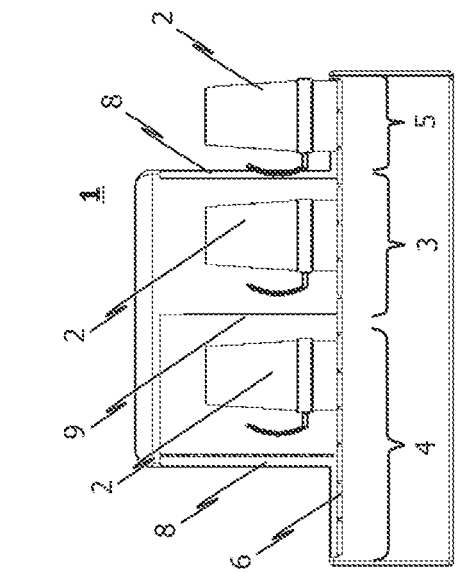

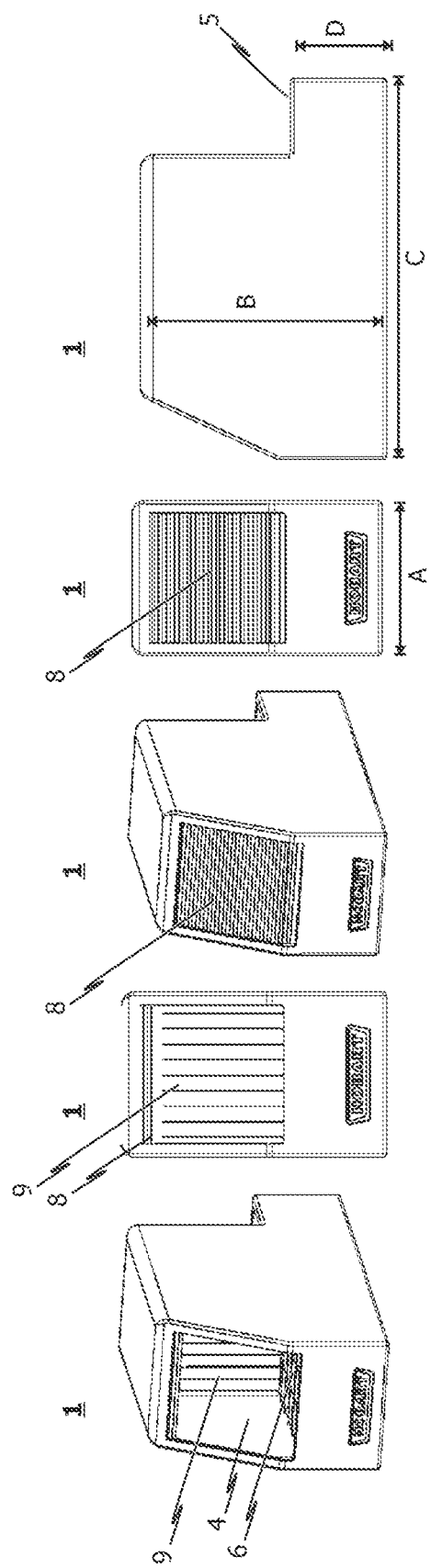
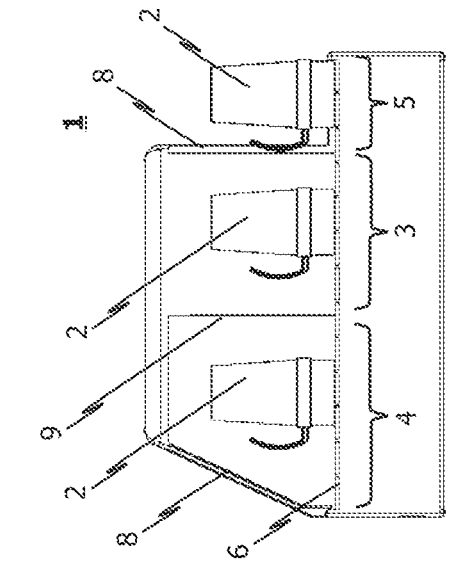
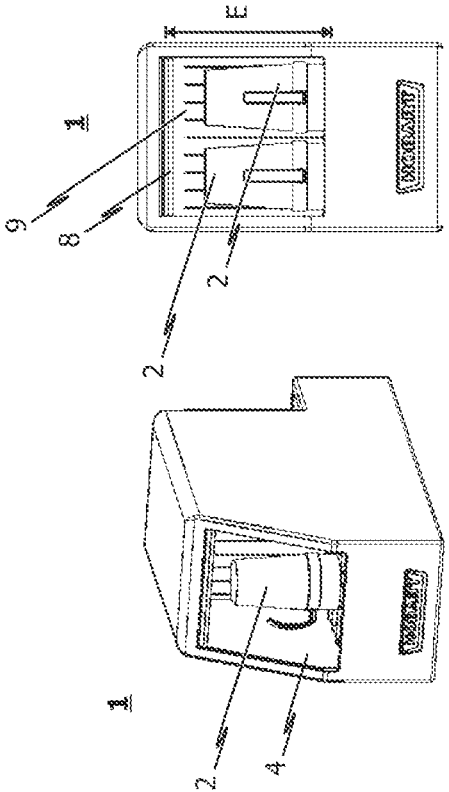

COUNTER SYSTEM FOR TRANSFERRING IN PARTICULAR AT LEAST PARTIALLY UNPACKAGED FOODSTUFFS, AND METHOD FOR RECEIVING CUSTOMER-SPECIFIC AND IN PARTICULAR PERSONALIZED ORDERS IN A COUNTER SYSTEM

TECHNICAL FIELD

The present invention relates, in general, to a novel counter concept which is configured so as to be able to prepare and sell foodstuffs optimally in an economical and also in an ecological respect.

Specifically, the present invention relates to a novel counter system for transferring in particular at least partially unpackaged foodstuffs. The invention furthermore relates to a method for receiving customer-specific and in particular personalized orders in a counter system.

BACKGROUND

Counter systems of the type under consideration here are counter systems for presenting, preparing and/or selling foodstuffs, in particular at least partially unpackaged foodstuffs.

The term "foodstuffs" used here should be understood as meaning in general substances which are consumed in order to nourish the human body. The term "foodstuffs" as a generic term comprises both drinking water and food. Drinking water is composed of water and mineral substances dissolved therein. In contrast to drinking water, foods are substantially composed of macronutrients—carbohydrates, lipids (fats) and proteins—and thus supply people with chemically bonded energy. In addition, micronutrients in the form of bulk elements and trace elements are essential constituents of foods.

A definition of foodstuffs law is supplied by the Regulation (EC) No 178/2002 (regulation on the basis of foodstuffs) in Article 2 regarding the Foodstuffs Law. According thereto, within the context of this Regulation, "foodstuffs" are all substances or products, whether processed, partially processed or unprocessed, that are intended to be, or can reasonably be expected to be ingested by humans.

Previous counter systems, in particular those which are used in the food retail trade and in catering, are used to present food and meals to the customer. Depending on the presented goods, counter systems conventionally have devices for cooling or maintaining the heat of the presented product, and, depending on whether the foods are themselves packaged or loose, devices, such as tubs, plate holders or simple shelves are provided. If the customer is intended merely to make a selection from what is presented, there are mounted display cases, behind which the food can be reached only by the staff on the other side of the counter.

If at least partially unpackaged foodstuffs are presented in such counter systems to the customer or potential customers, it is customary that, after the customer has made an appropriate selection, the at least partially unpackaged foodstuffs are passed to the customer in disposable crockery, in particular in disposable crockery made from plastic. An example which is mentioned in this respect are coffee shops in which it is customary to pass a specialty coffee selected by the customer to the customer in what is referred to as a "Coffee-To-Go" mug.

Due to the enormous quantity of plastic rubbish that arises daily due to disposable crockery, there is an endeavor to reduce the quantity of disposable crockery arising in particular in a counter-based business.

An approach to improving the eco-balance of conventional counter systems consists in using disposable crockery, for example disposable "Coffee-To-Go" mugs, that are recyclable. Within this context, for example, disposable crockery made from cellulose acetate or from what is referred to as oxo-degradable plastic is known.

However, the problem with such disposable crockery can be found in the fact that the oxo-degradable plastic can decompose only under certain defined conditions, with said certain conditions generally not being provided during recycling of the disposable crockery made from oxo-degradable plastic. As a consequence of this, the material of the disposable crockery breaks down into microplastic and can continue to cause stress to the environment and health.

Furthermore, the production of disposable crockery from oxo-degradable plastic is relatively complicated and thus also causes stress to the eco-balance.

Since there is a very low probability of recycling known disposable crockery made of what is referred to as degradable material, for example, of oxo-degradable plastic, the eco-balance for the preparation and transfer of in particular partially unpackaged foodstuffs can be effectively improved only if reusable crockery is used instead of disposable crockery in the transfer of the foodstuffs.

Offers to (re-)fill reusable mugs that have been brought along and belong to the customer with hot drinks to go ("Coffee-To-Go") are basically possible in catering establishments, in the catering industry, in community catering and in retail trade if the respectively responsible food business operator can guarantee that the relevant general hygiene regulations are met, for example the hygiene regulations defined in Article 3 of the Regulation (EC) No 852/2004.

In particular, the food business operator when (re-)filling reusable containers that have been brought along and belong to the customer, for example reusable mugs, is responsible for the fact that the reusable container can be considered to be a material that is recognized as safe for coming into contact with foodstuffs and meets the relevant general hygiene regulations. The provisions in Article 3 of the Regulation (EC) No 1935/2004 are mentioned as an example for the criteria of a material that is recognized as safe for coming into contact with foodstuffs.

For example, when handling mugs belonging to a customer for dispensing hot drinks by service or by self-service, the responsibility of the food business operator is indeed restricted "only" to the satisfactory condition of the foodstuff up to the filling operation. Since the vessel is the customer's property and is filled at the explicit behest of the customer, i.e. is not put into circulation by the food business operator, the business operator—at least in principle—cannot be ascribed any responsibility for the suitability and condition of the reusable container, for example mug.

However, the food business operator is entirely responsible for hygienically satisfactory operational processes. The operator has to ensure by means of suitable measures that, during the production, for example during the brewing and filling operation in the case of hot drinks, the risk of contamination of the environment or of other foodstuffs by the mug belonging to the customer is controlled and minimized. This applies both to forms of dispensing by service and also to self-service devices.

The individual spatial situation and different processes in the businesses mean that the precautions for avoiding contamination and minimizing risk when filling containers that have been brought along with foodstuffs, such as, for example, when filling mugs which have been brought along with hot drinks, can vary. It is incumbent on the responsible business operator of the respective form of dispensing (service or self-service) to evaluate the hygienic risks and to undertake a risk assessment.

It should be taken into consideration here that no containers belonging to customers may enter operational areas in which there is open handling of easily perishable foodstuffs. The handling of containers belonging to customers, for example mugs, by the operating staff "behind the counter" should basically be avoided. The use of decanting vessels or mug holders or trays for the customer mugs is optimum such that the customer mugs do not leave or go beyond the counter/bar area and thereby do not come into contact with operational devices, for example the coffee machine.

If, by contrast, containers belonging to customers, for example mugs for hot drinks, are obviously insufficiently clean or appear unsuitable for filling, this should be pointed out to the customer even if the state of the mug does not lie within the scope of responsibility of the business operator. In an individual case, the business operator or the authorized staff ultimately makes the decision about filling at the customer's request. Should a customer's clearly soiled reusable container pose a risk of contaminating the environment, since, for the filling, contact with operational devices is unavoidable, filling must consequently be declined as a precaution and from responsibility for the operational hygiene.

These food hygiene regulations for handling containers belonging to customers, for example mugs belonging to customers for dispensing hot drinks by service or self-service, lead to the food business operator basically bearing a residual risk. This in turn has a negative effect on the introduction of reusable crockery, in particular in food business operator chains, for example coffee shops, since, in the case of such food business operator chains, a risk analysis and assessment in situ can be effectively realized only with a high outlay, if at all.

Furthermore, it should be taken into consideration here that, in particular in the case of global food business operator chains, locally applicable hygiene practice may differ.

SUMMARY

The present invention is based on the problem that previous counter systems, such as are used, for example, in catering establishments, in the catering industry, in community catering and in retail trade, are not configured to firstly ensure the required presentation, preparation and sale of foodstuffs while, secondly, additionally ensuring a transfer of in particular partially unpackaged foodstuffs to the customers in an environmentally friendly manner while simultaneously maintaining the applicable hygiene rules or hygiene regulations.

On the basis of this problem, the present invention is therefore based on the object of specifying a counter concept with which it is possible to ensure the previous ordering operation as before, without amendments or at least without substantial amendments, while at the same time disposable crockery can be dispensed with without the working sequence for the acceptance of the order and processing of the order being slowed down without additional staff, with the applicable hygiene rules and/or hygiene regulations being reliably maintained even in the case of in particular partially unpackaged foodstuffs.

It is a further object of the present invention to specify an optimized method for receiving customer-specific and in particular personalized orders in a counter system, wherein the offer for (re-)filling reusable containers that have been brought along and belong to the customer with foodstuffs can be realized without an additional outlay on staff and while simultaneously maintaining the applicable hygiene rules and/or hygiene responsibilities.

Accordingly, according to the invention in particular a counter system for transferring in particular at least partially unpackaged foodstuffs is specified, wherein the counter system has a first region assigned to the counter staff and a second region segregated therefrom and assigned to the customer.

According to implementations of the invention, it is provided in particular that the counter system has a dishwasher for cleaning items of washware in particular in the form of mugs, cups, glasses, bowls or plates. The dishwasher of the counter system according to the invention has at least one treatment zone and at least one conveyor apparatus for conveying the items of washware to be cleaned from an introduction region of the dishwasher through the at least one treatment zone of the dishwasher to a removal region of the dishwasher.

It is in particular provided here that the introduction region of the dishwasher is accessible from the second region of the counter system, i.e. from the region assigned to the customer, in particular is accessible exclusively from the second region of the counter system, while, by contrast, the removal region of the dishwasher is in particular exclusively accessible from the first region of the counter system, i.e. from that region of the counter system which is assigned to the counter staff.

In comparison to counter systems and counter concepts known from the prior art, the counter system according to the invention has diverse advantages: the counter system according to the invention has a dishwasher which is in particular integrated in the counter system and has an introduction region which corresponds within the context of commercial dishwashing to the "unclean region". Said "unclean region" of the dishwasher belonging to the counter system is preferably accessible exclusively only from the second region of the counter system, i.e. that region of the counter system which is assigned to the customer. This provides a reliable segregation between the region "behind the counter" and the region "in front of the counter".

By means of this measure, in particular the risk of contamination of the environment by containers (mugs, etc.) which are not cleaned or not cleaned properly in the region of the operational devices necessary for filling the containers is minimized or even reduced to zero.

The dishwasher assigned to the counter system also has a removal region which corresponds to the "clean region" within the context of commercial dishwashing. Said "clean" region of the dishwasher belonging to the counter system according to the invention is preferably accessible exclusively from the first region of the counter system, i.e. from that region of the counter system which is accessible to the counter staff.

This measure ensures that containers belonging to customers, such as, in particular, mugs, cannot pass into operational regions in which there is open handling of easily perishable foodstuffs. In particular, this effectively avoids it being possible for the service staff "behind the counter" to handle reusable containers belonging to customers without a previous, hygienically satisfactory treatment of the reusable containers.

In particular, the provision of decanting vessels or mug holders or trays for the customer mugs can be dispensed with. The solution according to the invention guarantees in particular that hygienically sometimes unsatisfactory containers belonging to customers cannot come into contact with operational devices, such as, for example, a coffee machine.

The counter system according to the invention has the further advantage that the customary sequences for receiving orders, for the preparation and for the transfer of the ordered foodstuffs do not have to be modified, or at least only have to be insubstantially modified, despite the use of crockery pieces belonging to customers.

The offer for (re-)filling of reusable containers that have been brought along and belong to the customer with foodstuffs, for example, reusable mugs belonging to customers with hot drinks to go ("Coffee-To-Go") can be realized with the aid of the counter system according to the invention without more counter staff being required for this purpose or without the outlay on processing customer-specific and in particular personalized orders having to be increased.

Owing to the fact that, according to the invention, the introduction region of the dishwasher belonging to the counter system is accessible from the second region of the counter system, i.e. from that region of the counter system which is assigned to the customer, the customer on placing the order with the counter staff can supply their reusable container that the customer has brought along and belongs to the customer to the dishwasher via the introduction region. The dishwasher is preferably designed in such a manner that the complete cleaning of items of washware takes place within approximately 30 to 60 seconds, i.e. within the customary period of time in which an order can be received and can be billed by the counter staff. After the ordering and billing operation, the cleaned reusable container belonging to the customer is then present at the removal region of the dishwasher, specifically preferably in the direct region of action of the counter staff. Accordingly, no additional means have to be taken into consideration by the counter staff when a reusable container that has been brought along by the customer and belongs to the customer is intended to be (re-)filled.

The counter system according to the invention furthermore significantly reduces resources (water, energy and chemicals) for handling the reusable crockery belonging to customers. Previous counter systems are not designed to hygienically provide the service staff "behind the counter" with reusable containers belonging to customers. On the contrary, it is currently customary for reusable containers that have been brought along and belong to customers to be cleaned in a dishwasher outside the counter region. However, dishwashers of this type are generally designed to simultaneously clean a multiplicity of items of washware.

This means in practice that, for the offer for (re-)filling reusable containers that have been brought along and belong to customers, the reusable containers are cleaned individually in the dishwasher not belonging to the counter system, which entails an increased use of water, energy and chemicals.

In this connection, it is noted that the dishwasher belonging to the counter system for reusable mugs uses, for example, approximately 0.21 to 0.31 of fresh water for an energy use of 200 Wh. Water savings of between 50% and 70% and energy savings of the same order of magnitude can thus be obtained by this means.

In a preferred realization of the counter system according to the invention, the first region of the counter system, which region is assigned to the counter staff, is segregated from the second region of the counter system, which region is assigned to the customer, via a counter. This realization of the counter system according to the invention constitutes an easily realizable precaution for avoiding contamination and minimizing risk during the filling of containers that have been brought along.

A further precaution for avoiding contamination and minimizing risk can be seen in that the introduction region of the dishwasher can be separated, preferably spatially, from the removal region of the dishwasher, wherein in particular the introduction region of the dishwasher and the removal region of the dishwasher are formed in or at opposite end regions of the dishwasher, and/or wherein in particular the introduction region of the dishwasher is segregated from the removal region of the dishwasher, for example (but not absolutely necessary) via a partition.

These precautions ensure that the introduction region of the dishwasher, which constitutes the "unclean side" of the dishwasher, is present in the second region of the counter system, i.e. segregated from the operational devices, for example the coffee machine. On the other hand, the removal region of the dishwasher is accessible exclusively only by the counter staff.

A particularly preferred realization of the counter system makes provision for the counter system to have a counter that segregates the first region of the counter system from the second region of the counter system, wherein the counter has a first region for receiving the dishwasher and at least one second region arranged next to the first region. Said second region of the counter serves, for example, for the transfer of the foodstuffs ordered previously by the customer.

The dishwasher can be embodied as a top-counter machine and placed on the counter of the counter system. As an alternative thereto, it is conceivable for the dishwasher to be integrated at least in regions or partially in the counter system, wherein in particular only the removal and introduction regions of the dishwasher are located on the counter top.

In principle, it is also conceivable for the removal region and/or the introduction region of the dishwasher to be arranged below the counter top.

In this connection, it is conceivable, for example, for the counter system to have a counter that segregates the first region of the counter system from the second region of the counter system, wherein the introduction region of the dishwasher is connected to the at least one treatment zone of the dishwasher via at least one conveying track, in particular in the form of a conveyor belt, such that items of washware to be cleaned are able to be conveyed preferably automatically from the introduction region of the dishwasher to the at least one treatment zone of the dishwasher.

Since the dishwasher belonging to the counter system is configured in particular to clean individual items of washware, in order to realize a particularly compact constructional form of the dishwasher provision is made for the conveyor apparatus of the dishwasher to have at least one conveying track, in particular in the form of a conveyor belt, wherein the at least one conveying track has an effective width of preferably at most 30 cm and in particular at most 15 cm.

According to a development of the counter system according to the invention, it is provided that a freshwater tank that is fluidically connectable preferably in particular selectively to the freshwater system in order to supply the dishwasher with fresh water is integrated in the counter system.

Alternatively or additionally thereto, it is conceivable for a wastewater tank that is fluidically connectable preferably in particular selectively to the wastewater system to be integrated in the counter system in order to temporarily store wastewater that arises during operation of the dishwasher.

With these precautions, a dishwasher can be integrated in the counter system even if the counter system itself is not connected or connectable to the freshwater system and/or wastewater system.

In this connection, it is preferably provided that the wastewater tank is assigned a heat-exchanger system for selectively reusing at least some of the thermal energy of the wastewater that arises during operation of the dishwasher and, for example, for using same to heat the fresh water required during operation of the dishwasher.

The dishwasher belonging to the counter system according to the invention has in particular a conveyor apparatus which is configured to convey a previously defined or definable group of items of washware to be cleaned batch by batch from the introduction region through the at least one treatment zone and then to supply the group of items of washware as cleaned items of washware to the removal region.

As an alternative thereto, the conveyor apparatus can be configured to separately convey the items of washware to be cleaned from the introduction region through the at least one treatment zone and then to supply same as cleaned items of washware to the removal region.

This embodiment of the dishwasher belonging to the counter system makes it possible to selectively clean the fed-in washware individually, and therefore the dishwasher is suitable in particular for cleaning reusable drinking vessels, such as, for example, coffee cups.

The compact construction of the conveyor dishwasher according to the invention means that the latter is also suitable, in particular, as a dishwasher for reusable drinking vessels, for example a coffee-cup dishwasher, which can be set up in the immediate surroundings of the hot drinks machine/coffee machine and in particular is part of the counter system.

The conveyor dishwasher has a feed-in region, into which the dirty washware (in particular drinking vessel) is introduced. Furthermore, the conveyor dishwasher has a discharging region, which is spatially segregated from the feed-in region and where the clean washware can be removed.

The washware (drinking vessels such as cups, glasses, etc.) can be supplied, and likewise removed, individually (i.e. one after the other); however, it is basically possible to load the washware in relatively small groups.

In particular, the dishwasher belonging to the counter system according to the invention is a type of hybrid dishwasher, in which the technology of stationary box-type dishwashers for batch processes is combined with the technology of conveyor dishwashers, which are configured for continuous operation. The dishwasher firstly provides the advantage of stationary box-type dishwashers, which are configured for a batch process, while, secondly, the advantage of conveyor dishwashers is likewise used. The space required for setting up the dishwasher corresponds at maximum to the space required for a dishwasher configured as a stationary box-type dishwasher, wherein, at the same time, a continuous operation of the dishwasher, as is known in the case of conveyor dishwashers and is mentioned there as an advantage, is permitted.

In particular, it is conceivable in this connection for the conveyor apparatus to be configured to selectively convey either a previously defined group of items of wash ware to be cleaned batch by batch from the introduction region through the at least one treatment zone and then to supply the group of items of washware as cleaned items of washware to the removal region, or to individually convey the items of washware to be cleaned from the introduction region through the at least one treatment zone and then to supply them as cleaned items of washware to the removal region. In this way, in particular a personalized treatment and personalized supply of the treated items of washware to the removal region is possible.

In other words, a customer can feed their personal cup into the introduction region of the dishwasher, it being ensured that said personal cup is also discharged recognizably as such at the removal region.

In one conceivable realization of the solution according to the invention, it is provided that the conveyor apparatus of the dishwasher has at least one conveying track, in particular in the form of a conveyor belt, wherein said at least one conveying track is configured to individually guide the items of washware through the at least one treatment chamber of the dishwasher. In this connection, it is conceivable in particular for the width of the conveying track to be selected to be correspondingly narrow. In a preferred realization of the dishwasher belonging to the counter system according to the invention, the at least one conveying track thus has an effective width of preferably at most 30 cm and preferably at most 15 cm.

In particular for larger coffee shops, it is of advantage if the conveyor apparatus has at least two conveying tracks running parallel to one another, in particular in each case in the form of a conveyor belt. So that each of said two conveying tracks can individually convey the items of washware through the at least one treatment zone, a correspondingly (small) width of the conveying tracks should be selected, with the latter in particular having an effective width of at most 30 cm and preferably at most 15 cm.

According to embodiments of the solution according to the invention, the dishwasher belonging to the counter system has a control device that is configured to activate the at least one conveyor apparatus such that the items of washware to be cleaned are conveyed discontinuously from the introduction region of the dishwasher through the at least one treatment zone to the removal region of the dishwasher by the at least one conveyor apparatus.

In this connection, "discontinuously" means that the conveyor apparatus is used, for example, to convey the items of washware to be cleaned from the introduction region into the at least one treatment zone, wherein the conveyor apparatus is then stopped and the items of washware are cleaned in a fixed position in the treatment zone (washing phase and final rinse phase and optionally adjoining drying phase), with the cleaned items of washware then being conveyed to the removal region by the conveyor apparatus. By different treatments being carried out one after another in terms of time in one and the same treatment zone, the space required by the dishwasher is reduced.

As an alternative thereto, it is, however, of course also conceivable for the dishwasher to have a control device that is configured to activate the at least one conveyor apparatus such that the items of washware to be cleaned are conveyed continuously and in particular at a previously defined or definable conveying speed through the at least one treatment zone by the at least one conveyor apparatus. In this connection, it is expedient to arrange at least two treatment zones one after the other as seen in the conveying direction of the items of washware.

According to realizations of the counter system according to the invention, the at least one treatment zone of the dishwasher belonging to the counter system is configured to subject at least one item of washware fed to the at least one treatment zone via the at least one conveyor apparatus, temporally in succession, to a washing treatment and a downstream final rinse treatment and optionally drying downstream of the final rinse treatment.

Alternatively thereto, the dishwasher can have at least one first treatment zone, which is in the form of a washing zone, and at least one second treatment zone, which is downstream of the at least one first treatment zone—as seen in the conveying direction of the items of washware—and is in the form of a rinse zone, in particular a final rinse zone, wherein optionally the dishwasher also has at least one third treatment zone, which is in the form of a drying zone and is downstream of the at least one second treatment zone—as seen in the conveying direction of the items of washware.

According to realizations of the counter system according to the invention, it is provided that the dishwasher has a further conveyor apparatus for preferably automatically and in particular selectively conveying a cleaned item of washware from the removal region of the dishwasher to a dispenser, in particular to a dispenser for a cold or hot drink of a drinks machine or a coffee machine, wherein the dishwasher in particular also has a device for positioning and/or orienting the items of washware with respect to the dispenser.

Furthermore it is conceivable for the dishwasher to be assigned a deposit system, for returning an item of washware fed or to be fed into the introduction region of the dishwasher, in particular to the operator of the dishwasher, or for reuse of the item of washware fed or to be fed into the introduction region of the dishwasher.

The feed-in region and the discharging region, which are spatially segregated from each other, are preferably located on opposite sides of the machine.

For transfer to the conveyor apparatus, alignment of the washware and also orientation of the washware can be necessary. It is possible for correct alignment and/or orientation to be achieved mechanically in the dishwasher or, more simply, to be ensured by the user during loading, i.e. when feeding the washware into the feed-in region. This is aided by the necessary orientation being indicated for example visually.

According to a preferred embodiment of the present invention, for this purpose, the feed-in region has an access opening with a guideway which corresponds to the drinking vessel which is to be cleaned, wherein the guideway predetermines an orientation and possibly alignment of the washware (drinking vessel) during introduction of the washware (drinking vessels) into the feed-in region of the dishwasher.

According to embodiments of the dishwasher according to the invention, the discharging region of the dishwasher is configured in the form of a storage region in which a previously defined or definable number of cleaned containers, such as drinking vessels, can be stored on an interim basis. As an alternative or in addition thereto, it is conceivable for the feed-in region to be configured in the form of a storage region for the interim storage of containers (drinking vessels) which are yet to be cleaned.

Provision is particularly preferably made for the dishwasher to have a storage region in which a previously defined or definable number of cleaned containers, such as, for example, drinking vessels, can be stored on an interim basis, wherein the conveyor apparatus is configured to convey containers/drinking vessels selectively from the storage region to the discharging region of the dishwasher.

This solution has the advantage that, in the discharging region, a container/drinking vessel is discharged only when required by the user. This therefore rules out already cleaned washware in the discharging region from becoming dirty.

The storage region can be a plate onto which the conveyor apparatus pushes the cleaned drinking vessels (e.g. cups, mugs and the like) one after the other. For this purpose, the conveyor apparatus can have, for example, a conveyor belt.

If the dishwasher is used in combination with a hot drinks machine, it is of advantage if the drinking vessel is preheated in the storage region or at least in the discharging region of the dishwasher. It is conceivable in this connection, for example, to provide a corresponding heating device in the storage region or in the discharging region. The heating device can be in the form of heating coils beneath, or of radiant heaters above, the storage region and/or discharging region.

Moreover, the heating device can be arranged such that the drinking vessels are already being heated as they move out of the final rinse zone to the discharging region or storage region. In a particularly advantageous embodiment of the invention, the heating device can also be used for drying the drinking vessels.

According to a further aspect of the present invention, provision is made for the dishwasher to be configured in the form of a reverse vending machine for reusable drinking vessels, in particular coffee cups or the like, and preferably to have a money-return device. The money can be returned in the form of cash, a voucher, a chip card or by means of a cashless credit system, etc.

According to a development of the dishwasher belonging to the counter system according to the invention, said dishwasher has a control device in order to activate the conveyor apparatus and the activatable components (pump, valve, heating device, etc.) assigned to the washing zone and final rinse zone. The control device is preferably configured to coordinate the conveying of the washware through the treatment zones in dependence on the presence or absence of drinking vessels in the feed-in region and/or discharging region.

The counter system according to the invention is designed, as already explained, in particular for coffee shops. The compact design enables the dishwasher to be integrated, for example, in the counter concept of a coffee shop. The dishwasher can be embodied in particular as an under-counter machine, or preferably as a top-counter machine, and have dimensions adapted to a counter size.

The footprint of the dishwasher preferably has dimensions of at most 700 mm×1000 mm and preferably at most 500 mm×600 mm and even more preferably at most 350 mm×600 mm. These dimensions enable the dishwasher to easily be placed on a customary counter that generally has a depth of 600 mm. Similarly, the hybrid configuration of the dishwasher enables a relatively low overall height to be realized. According to embodiments, the dishwasher height is at most 500 mm.

According to realizations of the dishwasher, the latter has a door, for example a tambour door, for selectively closing an access opening to the introduction region of the dishwasher. Instead of a door, it is also possible for a splash curtain (splash cloth) to be provided at the access opening.

In particular, it is of advantage for the at least one treatment zone to be assigned a suction-extraction device for the suction extraction of water vapor, and/or for the at least one treatment zone to be assigned a splash guard for preventing water vapor and/or liquid from escaping from the at least one treatment zone.

The access opening preferably has a height of at most 300 mm and preferably at most 250 mm and a width of at most 500 mm and preferably at most 350 mm. This enables drinking vessels to be able to be introduced into the introduction region individually or next to one another.

According to embodiments of the dishwasher belonging to the counter system according to the invention, the conveyor apparatus used is a spiral or helix conveyor and/or a carousel conveyor. A suitable carousel conveyor is, for example, a turntable, in order to allow the washware to be conveyed in a circular manner.

The dishwasher preferably has a first door, preferably in the form of a tambour door, for selectively closing the access opening to the introduction region of the dishwasher and preferably also has a second door, preferably in the form of a tambour door, for selectively closing an access opening to the removal region of the dishwasher.

According to another aspect, a counter system for transferring foodstuffs includes: a counter having a first side at which a first region, assigned to the counter staff, is located and a second side at which a second region, assigned to the customer, is located, such that the counter separates the second region from the first region; a dishwasher for cleaning items of washware, wherein the dishwasher has a treatment zone, an introduction region for placement of items into the treatment zone and a removal region for removal of items form the treatment zone, wherein the introduction region of the dishwasher faces the second side of the counter and is accessible from the second region of the counter system and the removal region of the dishwasher faces the first side of the counter and is accessible from the first region of the counter system; wherein the dishwasher includes a housing extending upward from the counter and located between the first side of the counter and the second side of the counter; wherein the housing includes a loading opening facing the first region and a removal opening facing the second region.

BRIEF DESCRIPTION OF THE DRAWINGS

Exemplary embodiments of the counter system according to the invention will be described in more detail below with reference to the accompanying drawings, in which:

FIG. 3A shows, schematically and in an isometric view, a second exemplary embodiment of the dishwasher belonging to the counter system according to the invention, specifically in a state in which a door of the dishwasher to the introduction region is open and no item of washware is accommodated in the introduction region;

FIG. 3B shows, schematically and in a view of the introduction region, the second exemplary embodiment of the dishwasher belonging to the counter system according to the invention according to FIG. 3A;

FIG. 3C shows, schematically and in an isometric view, the second exemplary embodiment of the dishwasher belonging to the counter system according to the invention, specifically in a state in which a door of the dishwasher to the introduction region is closed;

FIG. 3D shows, schematically and in a view of the introduction region, the second exemplary embodiment of the dishwasher belonging to the counter system according to the invention according to FIG. 3C;

FIG. 3E shows, schematically and in a side view, the second exemplary embodiment of the dishwasher belonging to the counter system according to the invention;

FIG. 3F shows, schematically and in an isometric view, the second exemplary embodiment of the dishwasher belonging to the counter system according to the invention, specifically in a state in which a door of the dishwasher to the introduction region is open and at least one item of washware is accommodated in the introduction region;

FIG. 3G shows, schematically and in a view of the introduction region, the second exemplary embodiment of the dishwasher belonging to the counter system according to the invention according to FIG. 3F;

FIG. 3H shows, schematically and in a sectioned side view, the second exemplary embodiment of the dishwasher belonging to the counter system according to the invention, specifically in a state in which at least one item of washware is in each case present in the introduction region, in the at least one treatment zone and in the removal region of the dishwasher;

FIG. 4A shows, schematically and in an isometric view, a third exemplary embodiment of the dishwasher belonging to the counter system according to the invention, specifically in a state in which a door of the dishwasher to the introduction region is open and no item of washware is accommodated in the introduction region;

FIG. 4B shows, schematically and in a view of the introduction region, the third exemplary embodiment of the dishwasher belonging to the counter system according to the invention according to FIG. 4A;

FIG. 4C shows, schematically and in an isometric view, the third exemplary embodiment of the dishwasher belonging to the counter system according to the invention, specifically in a state in which a door of the dishwasher to the introduction region is closed;

FIG. 4D shows, schematically and in a view of the introduction region, the third exemplary embodiment of the dishwasher belonging to the counter system according to the invention according to FIG. 4C;

FIG. 4E shows, schematically and in a side view, the third exemplary embodiment of the dishwasher belonging to the counter system according to the invention;

FIG. 4F shows, schematically and in an isometric view, the third exemplary embodiment of the dishwasher belonging to the counter system according to the invention, specifically in a state in which a door of the dishwasher to the introduction region is open and at least one item of washware is accommodated in the introduction region;

FIG. 4G shows, schematically and in a view of the introduction region, the third exemplary embodiment of the dishwasher belonging to the counter system according to the invention according to FIG. 4F;

FIG. 4H shows, schematically and in a sectioned side view, the third exemplary embodiment of the dishwasher belonging to the counter system according to the invention, specifically in a state in which at least one item of washware is in each case present in the introduction region, in the at least one treatment zone and in the removal region of the dishwasher;

FIG. 5A shows, schematically and in an isometric view, a fourth exemplary embodiment of the dishwasher belonging to the counter system according to the invention, specifically in a state in which a door of the dishwasher to the introduction region is open and no item of washware is accommodated in the introduction region;

FIG. 5B shows, schematically and in a view of the introduction region, the fourth exemplary embodiment of the dishwasher belonging to the counter system according to the invention according to FIG. 5A;

FIG. 5C shows, schematically and in an isometric view, the fourth exemplary embodiment of the dishwasher belonging to the counter system according to the invention, specifically in a state in which a door of the dishwasher to the introduction region is closed;

FIG. 5D shows, schematically and in a view of the introduction region, the fourth exemplary embodiment of the dishwasher belonging to the counter system according to the invention according to FIG. 5C;

FIG. 5E shows, schematically and in a side view, the fourth exemplary embodiment of the dishwasher belonging to the counter system according to the invention;

FIG. 5F shows, schematically and in an isometric view, the fourth exemplary embodiment of the dishwasher belonging to the counter system according to the invention, specifically in a state in which a door of the dishwasher to the introduction region is open and at least one item of washware is accommodated in the introduction region;

FIG. 5G shows, schematically and in a view of the introduction region, the fourth exemplary embodiment of the dishwasher belonging to the counter system according to the invention according to FIG. 5F;

FIG. 5H shows, schematically and in a sectioned side view, the fourth exemplary embodiment of the dishwasher belonging to the counter system according to the invention, specifically in a state in which there is at least one item of washware in each case in the introduction region, in the at least one treatment zone and in the removal region of the dishwasher;

DETAILED DESCRIPTION

Figure 1:
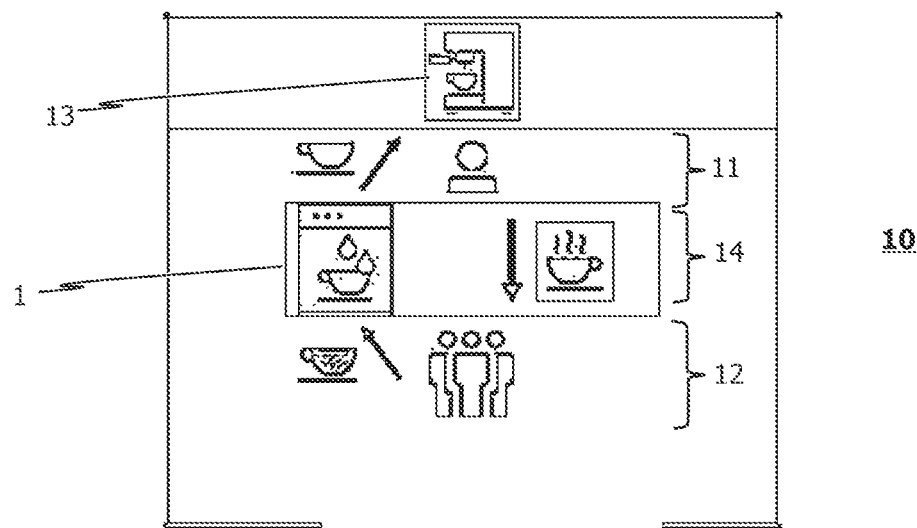
FIG. 1 shows, schematically, an exemplary embodiment of the counter system according to the invention.

FIG. 1 shows, schematically, an exemplary embodiment of the novel counter concept, specifically using the example of a coffee shop. The counter concept is designed in such a manner that an offer for (re-)filling reusable mugs that have been brought along and belong to customers with hot drinks to go can be realized, with it being ensured that the applicable hygiene rules or hygiene regulations are maintained by the coffee shop without additional staff being required for serving the customers and without the working sequence for the acceptance of an order and for processing the order being slowed down.

The counter system 10 serves here for receiving customer-specific orders, optionally for billing the orders and in particular for the transfer of the ordered products. The ordered products are in particular at least partially unpackaged foodstuffs, such as, for example, drinks or cookies, etc.

As is customary in catering establishments, in the catering industry, in community catering and in the retail trade, the counter system 10 has a first region 11 assigned to the counter staff and a second region 12 segregated therefrom and assigned to the customer.

The counter system 10 that is illustrated schematically in FIG. 1 is distinguished by the latter having a dishwasher 1 for cleaning items of washware 2 in particular in the form of mugs, cups, glasses, bowls or plates.

As will be subsequently explained with respect to the embodiments of possible dishwashers 1 that are shown in FIG. 2 to FIG. 8, the dishwasher 1 has at least one treatment zone 3 and at least one conveyor apparatus 6 for conveying the items of washware 2 to be cleaned from an introduction region 4 of the dishwasher 1 through the at least one treatment zone 3 of the dishwasher 1 to a removal region 5 of the dishwasher 1. In particular, it is provided in this connection that the introduction region 4 of the dishwasher 1 is accessible from the second region 12 of the counter system 10 and the removal region 5 of the dishwasher 1 is accessible from the first region 11 of the counter system 10.

In this case, the introduction region 4 of the dishwasher 1 belonging to the counter system 10 corresponds to the "unclean region" in the context of commercial dishwashing. Said "unclean region" of the dishwasher 1 belonging to the counter system 10 is accessible exclusively only from the second region 12 of the counter system 10, that is to say from that region of the counter system 10 which is assigned to the customer.

The customer can thus feed a container 2 that is possibly not yet cleaned and does not comply with the applicable hygiene rules and/or hygiene regulations into the introduction region 4 of the dishwasher 1, wherein said container 2 is then conveyed, preferably automatically, through the at least one treatment zone 3 of the dishwasher 1 and is made available in the cleaned state at the removal region 5 of the dishwasher 1 to the counter staff. The dishwasher 1 is preferably designed here in such a manner that the cleaning of an item of washware takes up less than 60 seconds and preferably less than 40 seconds.

During this period of time necessary for cleaning the containers 2 belonging to customers, the order can be taken at the same time by the counter staff. The ordering, the billing of the ordered products, etc. customarily lasts at least one minute per customer.

The item of washware 2 cleaned by the dishwasher 1 can then be filled with the ordered foodstuffs, such as, for example, with a hot drink from a coffee machine 13, by the counter staff and subsequently transferred to the customer.

Variant embodiments of the dishwasher 1 belonging to the counter system 10 according to the invention will be described below with reference to the illustrations in FIG. 2 to FIG. 8.

Figure 2:
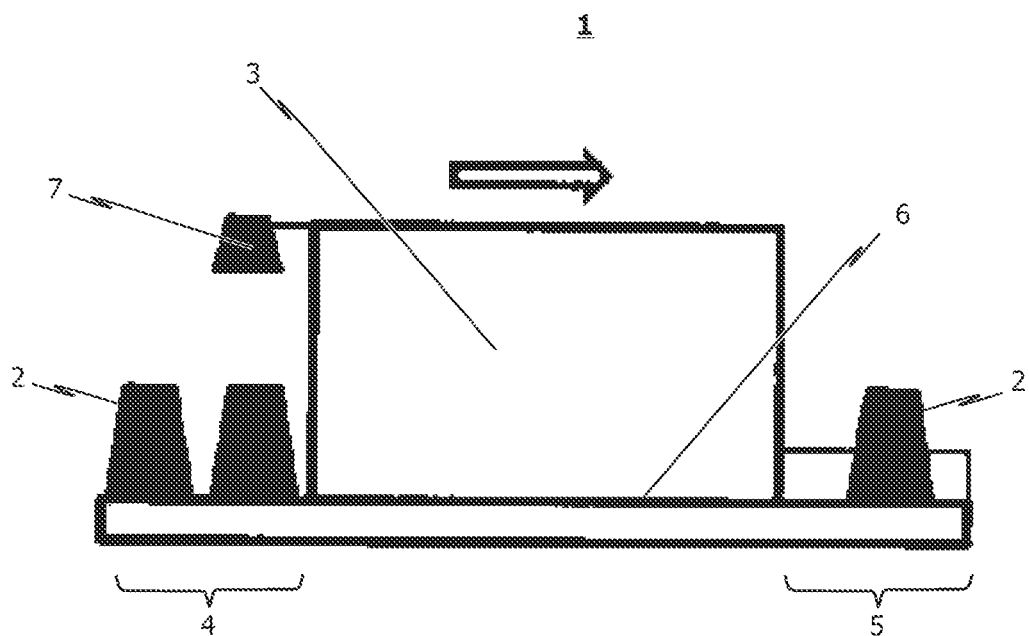
FIG. 2 shows, schematically and in a side view, a first exemplary embodiment of a dishwasher belonging to the counter system according to the invention.
Figure 6C:
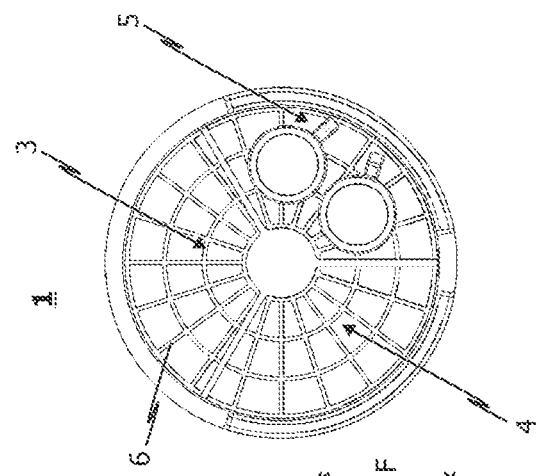
FIG. 6C shows, schematically and in a sectioned top view, the fifth exemplary embodiment of the dishwasher belonging to the counter system according to the invention according to FIG. 6B.
Figure 6B:
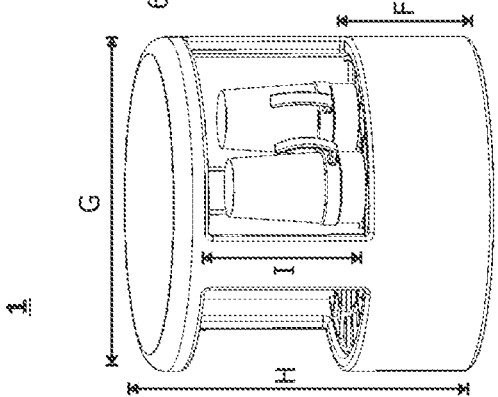
FIG. 6B shows, schematically and in an isometric view, the fifth exemplary embodiment of the dishwasher belonging to the counter system according to the invention, specifically in a state in which two items of washware are accommodated in the removal region of the dishwasher.
Figure 6A:
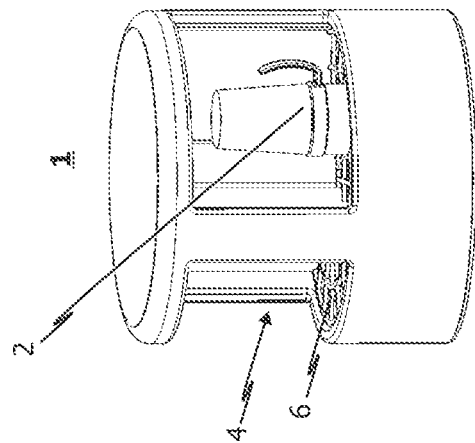
FIG. 6A shows, schematically and in an isometric view, a fifth exemplary embodiment of the dishwasher belonging to the counter system according to the invention, specifically in a state in which an item of washware is accommodated in the removal region of the dishwasher.

FIG. 2 shows, schematically and in a side view, a first exemplary embodiment of the dishwasher 1 belonging to the counter system 10 according to the invention. The dishwasher 1 is suitable in particular for cleaning items of washware 2 in the form of drinking vessels, in particular in the form of mugs, cups, glasses or bottles.

For this purpose, the dishwasher 1 has at least one treatment zone 3 and at least one conveyor apparatus 6 for conveying the items of washware 2 to be cleaned from an introduction region 4 of the dishwasher 1 through the at least one treatment zone 3 of the dishwasher 1 to a removal region 5 of the dishwasher 1.

The conveyor apparatus 6 is configured here to convey a previously defined or definable group of items of washware 2 to be cleaned batch by batch from the introduction region 4 through the at least one treatment zone 3 and then to supply the group of items of washware 2 as cleaned items of washware 2 to the removal region 5, or to individually convey the items of washware 2 to be cleaned from the introduction region 4 through the at least one treatment zone 3 and then to supply them as cleaned items of washware 2 to the removal region 5.

Specifically, the dishwasher 1 has a housing in which a washing zone and a final rinse zone are accommodated as treatment zones 3.

The final rinse zone is a fresh-water final rinse zone, in which fresh water with final rinse agent possibly added is sprayed onto the washware which is to be treated.

It is conceivable in this connection for yet another treatment zone 3, in the form of a pump-assisted final rinse zone, to be provided between the washing zone and the final rinse zone. In this pump-assisted final rinse zone, the liquid sprayed previously in the fresh-water final rinse zone is sprayed onto the washware with recirculating action.

The individual treatment zones 3 of the dishwasher 1 can be spatially segregated from one another, wherein a corresponding splash guard, for example in the form of a curtain, can be provided between the treatment zones 3 in order to prevent excess splashing of liquid and to prevent the washware from becoming dirty again.

In order, however, to obtain as compact a design of the dishwasher 1 as possible, it is of advantage for the treatment zones 3, or for at least some of the treatment zones 3, of the dishwasher 1 to be formed in a common treatment chamber of the dishwasher 1. In this case, the dishwasher 1 should have a control device that is configured to activate the at least one conveyor apparatus 6 such that the items of washware 2 to be cleaned are conveyed discontinuously from the introduction region 4 of the dishwasher 1 through the at least one treatment zone 3 to the removal region 5 of the dishwasher 1 by the at least one conveyor apparatus 6.

The exemplary embodiment of the dishwasher 1 belonging to the counter system 10 according to the invention, as is illustrated by way of example in FIG. 2, is distinguished in that it has an introduction region 4, into which the washware which is to be cleaned in the dishwasher 1 can be fed in/inserted manually. Also provided is a removal region 5, which is formed separately from the introduction region and via which the washware treated/cleaned in the treatment zones 3 of the dishwasher 1 is discharged.

The introduction region 4 and the removal region 5 are configured, in particular, on opposite sides of the housing of the dishwasher 1.

The dishwasher 1 also has the at least one conveyor apparatus 6 that has already been mentioned and by means of which the (dirty) washware fed into the introduction region 4 is conveyed through the treatment zones 3 of the dishwasher 1 to the removal region 5.

The compactness of the dishwasher 1 means that the loading opening of the introduction region 4 can be correspondingly small. If, as is the case in the exemplary embodiments shown in the drawings, the dishwasher 1 serves for cleaning drinking vessels, in particular reusable drinking vessels such as coffee cups, the loading opening to the introduction region 4 can be a little higher than the drinking vessel 2 which is to be treated.

Although not illustrated in FIG. 2, the access opening of the introduction region 4 of the dishwasher 1 can be assigned a guideway which corresponds to the drinking vessel 2 which is to be cleaned, in order to predetermine an orientation of the drinking vessel 2 when the drinking vessel 2 is introduced into the introduction region 4.

The removal region 5 of the dishwasher 1 according to FIG. 2 is designed in the form of a storage region and serves for the interim storage of a previously defined or definable number of cleaned drinking vessels 2. In the same way, the introduction region 4 of the dishwasher 1 can likewise be designed in the form of a storage region, for the interim storage of a previously defined or definable number of drinking vessels 2 which are to be cleaned. This allows what is referred to as a batch operation of the dishwasher 1.

The dishwasher 1 preferably has a control device for correspondingly activating the conveyor apparatus 6 and the activatable components assigned to the washing and final rinse zone. The control device is configured to activate the conveyor apparatus 6 of the dishwasher 1 and optionally the activatable components of the washing and final rinse zone in dependence on a presence or absence, or in dependence on a number, of drinking vessels 2 in the introduction region 4 and/or removal region 5.

Although not illustrated in FIG. 2, it is conceivable for the dishwasher 1 to be configured in the form of a reverse vending machine for reusable drinking vessels 2, in particular coffee cups, and preferably to have a corresponding money-return device.

The solution according to the invention can save time in respect of handling. Dirty washware (drinking vessels 2) passes directly into the dishwasher 1, i.e. there is no need for dirty drinking vessels 2 to be conveyed into a kitchen or for clean drinking vessels 2 to be conveyed back from the kitchen to the hot-drinks machine.

The dishwasher 1 belonging to the counter system 10 according to the invention is suitable in particular as a special coffee-cup dishwasher 1 which ideally is located in the immediate vicinity of the coffee machine 13 or even as an integral part in a coffee shop or similar installation site. The dishwasher 1 has a feed-in location in which the dirty crockery is introduced and a discharging location, which is segregated therefrom, where the clean crockery can be removed. The cups, glasses, etc. can be fed in and also removed individually (i.e. one after another), and loading in relatively small groups should optionally also be possible.

The feed-in location is preferably located on a dirty side and the discharging location on a spatially segregated clean side. For example, the cup can be introduced on the one side by a customer and can be removed on the opposite side by the same customer, or by a different customer, or even by service staff.

The dishwasher 1 belonging to the counter system 10 according to the invention is suitable, for example, for use in coffee shop chains, for example Starbucks: a customer enters the coffee shop with "their" cup and requests re-filling into "their" cup.

The cup is automatically washed by the dishwasher 1 and then re-filled. So that the customer also actually gets "their" own cup back, the cup is identified, either by analog or digital means.

In order to realize this embodiment, it is conceivable for the dishwasher 1 to have, preferably in or at the introduction region 4, a system 7 for identifying an item of washware, wherein the system 7 for identifying an item of washware is configured to assign an item of washware 2 in or at the introduction region 4 with an identifier which permits an unambiguous identification of the item of washware, which is fed in in the introduction region 4, in the removal region 5 of the dishwasher 1.

In this connection, it is conceivable for the dishwasher 1 to have, preferably in or at the introduction region 4, a system 7 for identifying an item of washware, wherein the system 7 for identifying an item of washware is configured to assign an item of washware 2 in or at the introduction region 4 with an identifier which permits an unambiguous identification of the item of washware, which is fed in into the introduction region 4, in the removal region 5 of the dishwasher 1.

In principle, it is of advantage for the system 7 for identifying an item of washware to be configured to, preferably automatically or optionally automatically, detect at least one feature of an item of washware fed in in the introduction region 4 of the dishwasher 1, wherein the system 7 for identifying an item of washware is furthermore configured to use the at least one feature detected in the introduction region 4 of the dishwasher 1 to again recognize the corresponding item of washware 2 in the removal region 5 of the dishwasher 1 and to preferably correspondingly identify same, or to personalize, highlight or to separate it from other items of washware 2 in the removal region 5.

In particular, the dishwasher 1 belonging to the counter system 10 according to the invention is configured, on account of its design and overall size, to be integrated in the counter region, for example of a coffee shop, such that the dirty cup can be placed by the customer into the machine in a region in front of the counter, and then, after the washing process has taken place, the clean cup can be removed from the machine by the staff behind the counter 14 in order then to use said cup directly for re-filling as per the customer's order.

The removal region 5 of the dishwasher 1 can additionally be provided with a type of conveyor belt/conveyor, with which it is possible to convey the clean washware from the actual removal region 5 into an additional storage region, for example next to the dishwasher 1 or on the other side of the coffee machine 13, in order thereby to increase the capacity, or the maximum possible number of cups and glasses which can be circulated, as desired without having to increase the size of the actual dishwasher 1 for this purpose.

In particular, it is conceivable in this connection that the clean washware is not conveyed by the additional conveyor belt/conveyor into a separate storage region; instead, there is a direct connection to a coffee machine 13 (including rotation of the cup by 180° such that the opening faces upward), and therefore, directly after the washing process has taken place, the clean cup can be completely automatically filled with the drink according to the customer's order.

Further embodiments of the dishwasher 1 belonging to the counter system 10 according to the invention will be described in more detail below with reference to the illustrations in FIG. 3A to FIG. 8.

Specifically, these embodiments are each designed as top-counter machines such that they can easily be placed onto a counter, for example, of a coffee shop. The embodiments of the dishwashers 1 belonging to the counter system 10 according to the invention are configured to convey items of washware 2 from the introduction region 4 through the at least one treatment zone 3 batch by batch and then to supply the items of washware 2 as cleaned items of washware 2 to the removal region 5.

The dishwasher 1 here can have a door 8, in particular a tambour door, for selectively closing an access opening to the introduction region 4 of the dishwasher 1. The door 8 can be actuable manually or automatically. In the case of an automatic actuation of the door 8, the introduction region 4 can be assigned a sensor arrangement which is configured to detect the presence of an item of washware 2 in the introduction region 4, wherein the sensor arrangement on detecting an item of washware 2 in the introduction region 4 activates a door mechanism to close the door 8 and to start a treatment program of the dishwasher 1.

The dishwashers 1 according to the embodiments shown in FIG. 3A to FIG. 8 are therefore in particular suitable for coffee shops in which the customers bring their own cup, but wherein said cup still has to be cleaned in situ prior to being filled, for example, with a hot drink. The cup which is to be cleaned can then be conveyed individually from the introduction region 4 through the treatment zone 3 and then supplied to the removal region 5.

On the other hand, the dishwashers 1 are also suitable for situations in which a plurality of items of washware 2 have to be cleaned simultaneously, as is the case, for example, whenever there is washware 2 which should not be personalized. In this case, the items of washware 2 to be cleaned can be conducted batch by batch through the treatment zone 3 as a group.

In the embodiments shown in FIG. 3A to FIG. 8, provision is made for the conveyor apparatus 6 of the dishwasher 1 to have a conveying track, in particular in the form of a conveyor belt, wherein said conveying track is configured to guide the items of washware 2 individually or in pairs through the at least one treatment chamber 3 of the dishwasher 1. The width of the conveying track here is selected to be correspondingly narrow. In preferred realizations of the dishwasher 1 belonging to the counter system 10 according to the invention, the conveying track has an effective width of preferably at most 30 cm and preferably of at most 15 cm.

The embodiments, shown in FIG. 3A to FIG. 8, of the dishwasher 1 belonging to the counter system 10 according to the invention have a control device which is configured to activate the conveyor apparatus 6 such that the items of washware 2 to be cleaned are conveyed discontinuously from the introduction region 4 of the dishwasher 1 through the at least one treatment zone 3 to the removal region 5 of the dishwasher 1 by the conveyor apparatus 6.

The items of washware 2 to be cleaned are conveyed by the conveyor apparatus 6 from the introduction region 4 into the at least one treatment zone 3, wherein the conveyor apparatus 6 is then stopped and the items of washware 2 are cleaned in a fixed position in the treatment zone 3 (washing phase and final rinse phase and optionally following drying phase), wherein then the conveyor apparatus 6 is used to convey the cleaned washware 2 to the removal region 5.

FIGS. 6A-6C and FIG. 8 show an embodiment of the dishwasher 1 belonging to the counter system 10 according to the invention, in which a carousel conveyor is used as the conveyor apparatus 6. For example, a turntable is suitable as the carousel conveyor, for allowing the washware 2 to be conveyed in a circular manner.

The access opening of the dishwasher 1 belonging to the counter system 10 according to the invention preferably has a height of at most 300 mm and a width of at most 500 mm and preferably of at most 350 mm.

The preferred dimensions of the dishwashers 1 shown in FIG. 3A to FIG. 6 are summarized in the following table:

| | | |
|---|---|---|
| A | 140 to 340 mm | preferably 200 to 280 mm |
| B | 285 to 485 mm | preferably 345 to 425 mm |
| C | 400 to 850 mm | preferably 500 to 600 mm |
| D | 100 to 250 mm | preferably 120 to 200 mm |
| E | 150 to 300 mm | preferably 180 to 240 mm |
| F | 100 to 250 mm | preferably 120 to 200 mm |
| G | 300 to 650 mm | preferably 350 to 550 mm |
| H | 285 to 485 mm | preferably 345 to 425 mm |
| I | 150 to 300 mm | preferably 180 to 240 mm |

The dishwasher 1 is furthermore preferably provided with a splash guard 9 in order to screen the introduction region 4 from the at least one treatment chamber 3 and in particular also to prevent water vapor from escaping.

Figure 7:
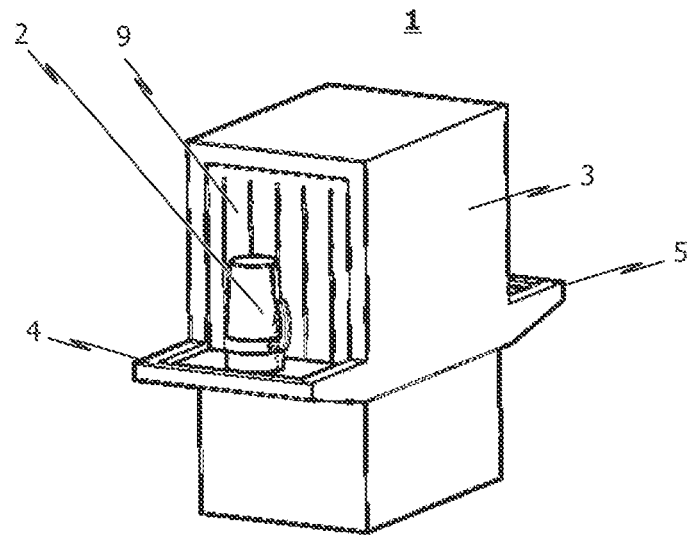
FIG. 7 shows, schematically and in an isometric view, a further variant embodiment of a dishwasher belonging to the counter system according to the invention.

FIG. 7 shows, schematically and in an isometric view, a further variant embodiment of a dishwasher 1 belonging to the counter system 10 according to the invention.

The dishwasher 1 shown in FIG. 7 substantially corresponds in a structural and functional respect to the previously described dishwashers 1, wherein, however, provision is made in the variant embodiment shown in FIG. 7 for at least part of the dishwasher 1 to be arranged beneath the counter top, for example the lower region of the dishwasher 1, in which the pumps and the at least one wash tank of the dishwasher 1 are accommodated.

Figure 8:
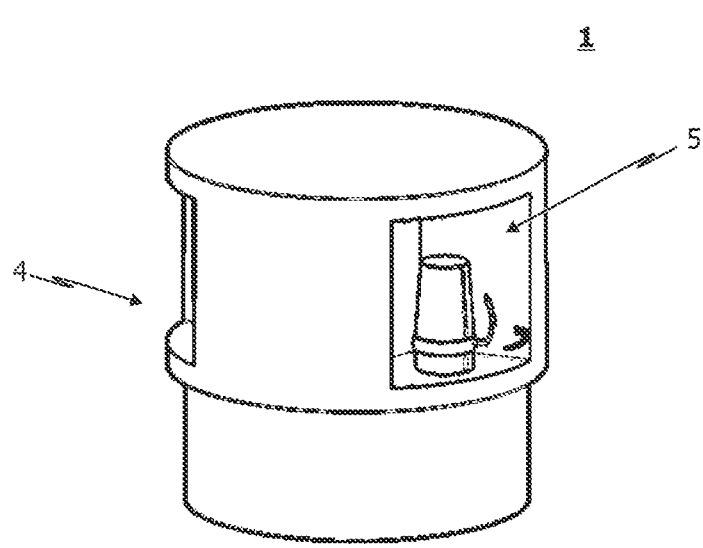
FIG. 8 shows, schematically and in an isometric view, a further variant embodiment of a dishwasher belonging to the counter system according to the invention.
Figure 9A:
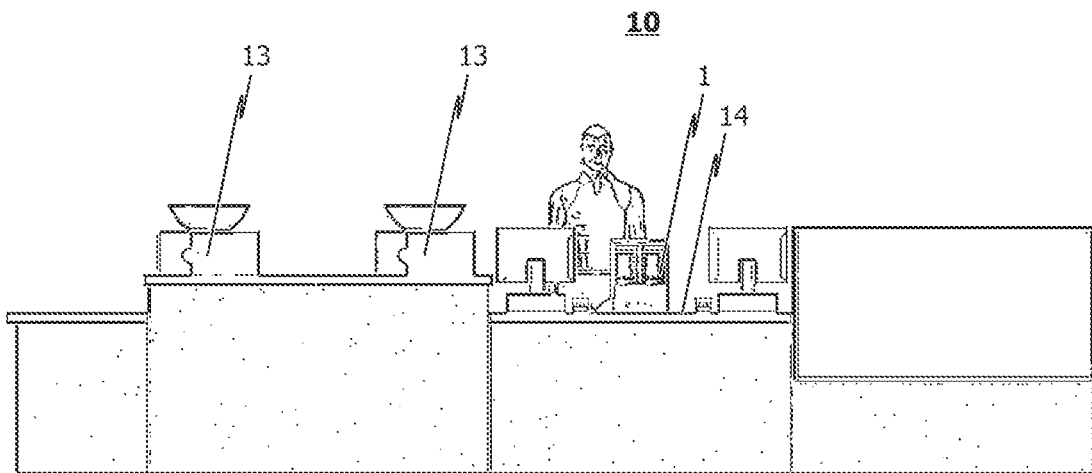
FIG. 9A to 9D show, in different views and in each case schematically, a variant embodiment of the counter system according to the invention.
Figure 9B:
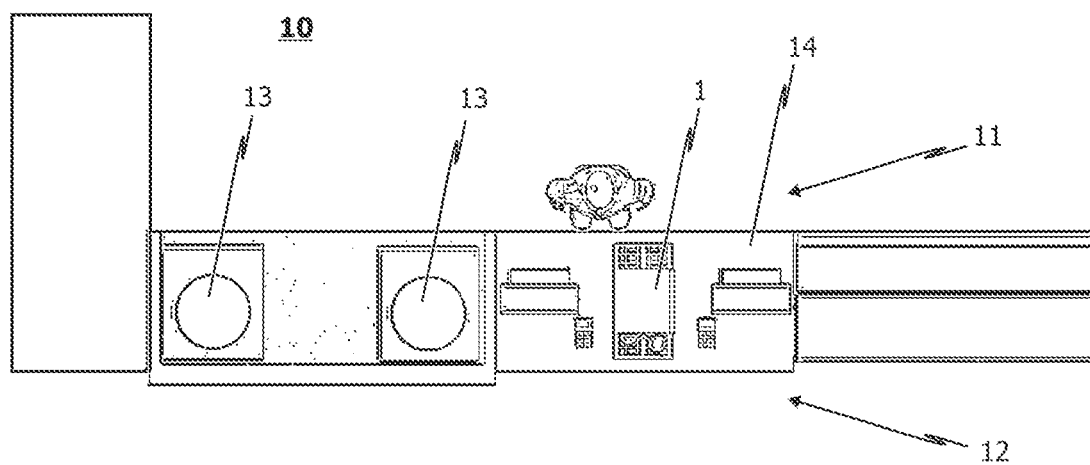
Figure 9C:
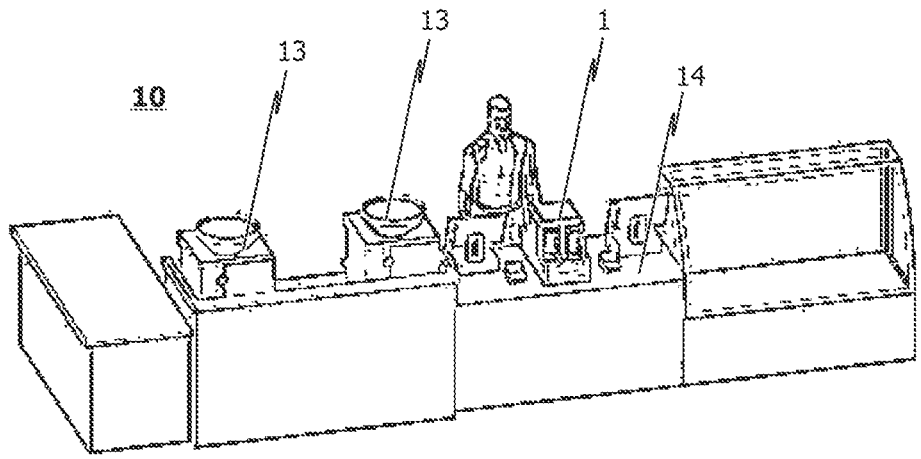
Figure 9D:
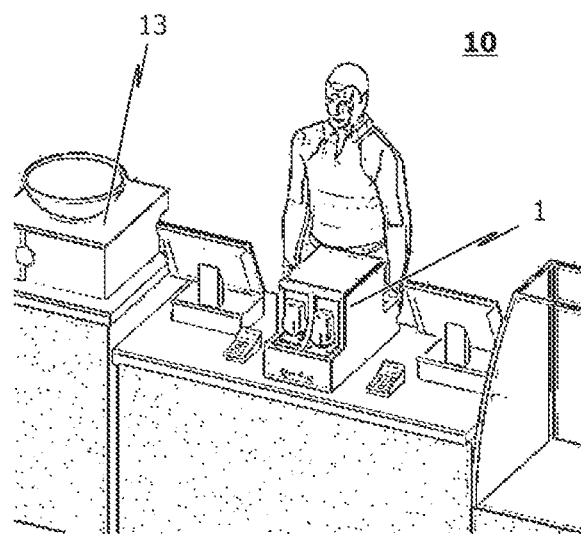
Figure 10A:
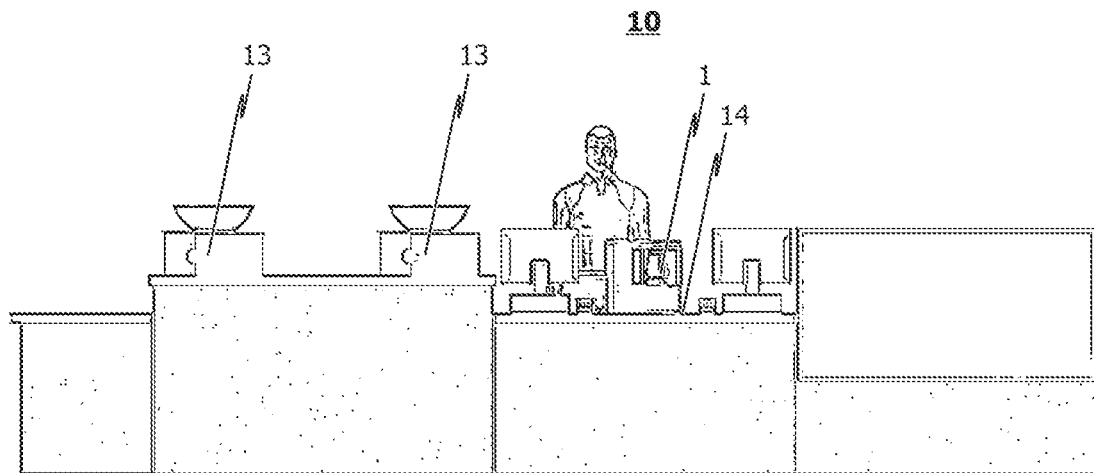
FIG. 10A to 10D show, in different views and in each case schematically, a variant embodiment of the counter system according to the invention.
Figure 10B:
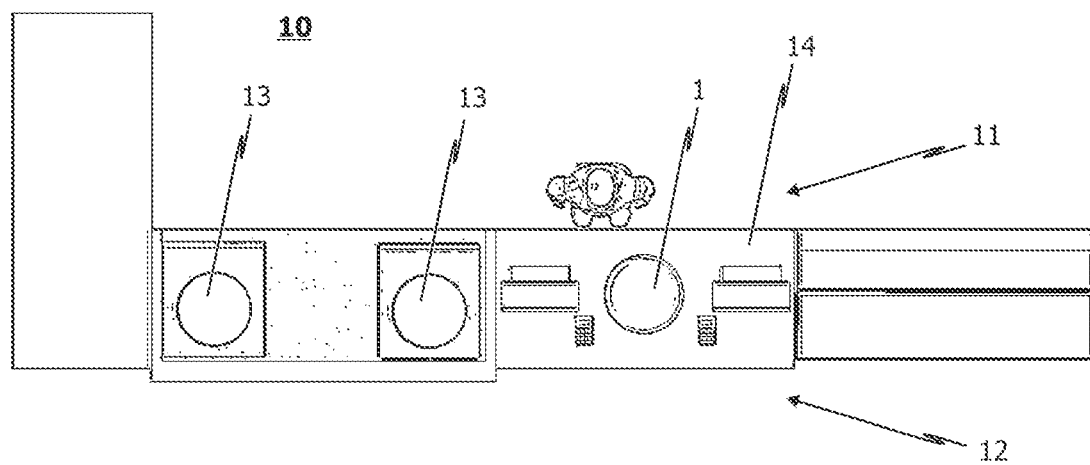
Figure 10C:
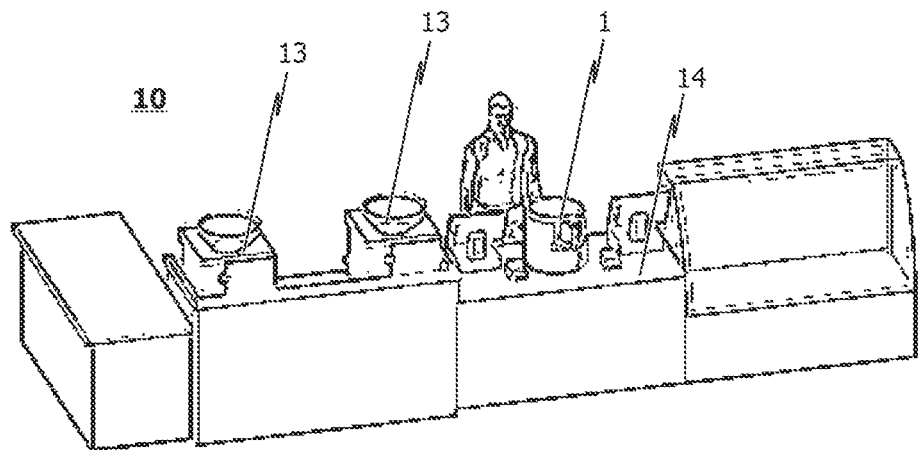
Figure 10D:
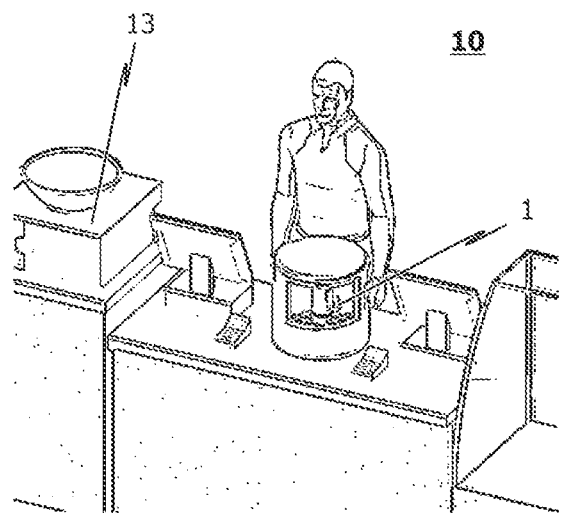

An alternative embodiment of such a dishwasher 1 which can be at least partially integrated in the counter of the counter system 10 is shown schematically and in an isometric view in FIG. 8. This dishwasher 1 comprises a conveyor apparatus 6 in the form of a carousel.

FIG. 9A to FIG. 9D show, in different views and in each case schematically, embodiments of the counter system 10 according to the invention. The counter system 10 of this embodiment comprises a dishwasher 1 in which the introduction region 4 and the removal region 5 are provided on opposite sides of the dishwasher 1.

By contrast, in the case of the counter concept shown schematically in FIGS. 10A to 10D, a dishwasher 1 is provided which has a conveyor apparatus 6 in the form of a carousel.

Rather than being restricted to those embodiments which are shown in the drawings, the invention is a combination of all of the features disclosed herein.

In particular, the invention furthermore relates to a method for receiving customer-specific and in particular personalized orders in a counter system 10 of the above-described type according to the invention. The method is distinguished in that, as the order is being taken, preferably at the same time, a container 2 belonging to a customer is cleaned by the dishwasher 1 belonging to the counter system 10 and, after the end of the ordering, is available in cleaned form to the counter staff.

The invention claimed is:

1. A counter system for transferring at least partially unpackaged foodstuffs, wherein the counter system comprises:
a counter having a first side at which a first region, assigned to the counter staff, is located and a second side at which a second region, assigned to the customer, is located, such that the counter separates the second region from the first region,
a dishwasher for cleaning items of washware, wherein the dishwasher has a treatment zone, an introduction region for placement of items into the treatment zone and a removal region for removal of items form the treatment zone, wherein the introduction region of the dishwasher faces the second side of the counter and is accessible from the second region of the counter system and the removal region of the dishwasher faces the first side of the counter and is accessible from the first region of the counter system;
wherein the dishwasher includes a housing extending upward from the counter and located between the first side of the counter and the second side of the counter;
wherein the housing includes a loading opening facing the second region and a removal opening facing the first region;
wherein the counter has a depth defined between the first side and the second side, and a width, wherein the width of the counter is greater than a width of the housing, such that the counter extends laterally beyond both lateral sides of the housing.

2. The counter system as claimed in claim 1, wherein the loading opening and the removal opening are located at opposite ends of the dishwasher.

3. The counter system as claimed in claim 1, wherein the at least one treatment zone is configured to subject at least one item of washware to a washing treatment and a final rinse treatment.

4. The counter system as claimed in claim 1, wherein the at least one treatment zone of the dishwasher is assigned a suction-extraction device for the suction extraction of water vapor; and/or
wherein the at least one treatment zone of the dishwasher is assigned a splash guard for preventing water vapor and/or liquid from escaping from the at least one treatment zone.

5. The counter system of claim 1, wherein the housing comprises a cylindrical housing.

6. The counter system of claim 1, further comprising at least one coffee machine located on a counter region that is between the first side and the second side and that is spaced laterally away from the dishwasher.

7. The counter system of claim 1, wherein the depth of the counter is greater than a depth of the housing.

* * * * *